Nov. 28, 1944.  B. M. W. FILLMORE  2,363,952
FLUID TRANSMISSION
Filed June 15, 1942
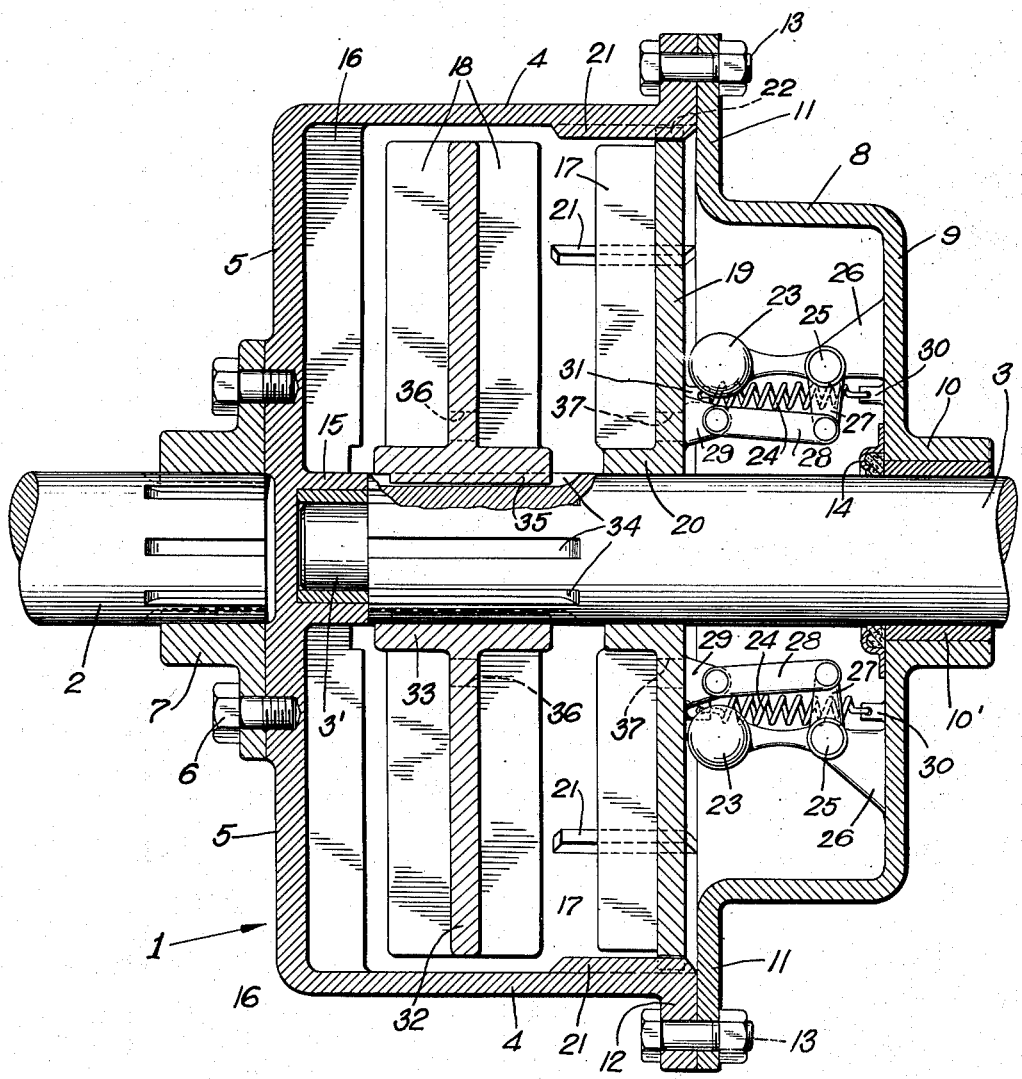
INVENTOR
BAXTER M. W. FILLMORE
BY
ATTORNEYS

UNITED STATES PATENT OFFICE 2,363,952

FLUID TRANSMISSION

Baxter M. W. Fillmore, Jericho Beach, Vancouver, British Columbia, Canada

Application June 15, 1942, Serial No. 447,064

8 Claims. (Cl. 60—54)

This invention relates to fluid power transmissions and particularly to automatic transmissions for automotive vehicles.

One object of the invention is a transmission embodying an automatic fluid clutch of novel and improved construction and operation whereby at a predetermined idling speed of the motor no torque is transmitted but with increased speed under the control of the operator power is transmitted, with the correct amount of power being always automatically adjusted responsive to the load.

A further object of the invention is a novel and improved fluid transmission clutch of the above indicated character, which is characterized by its efficiency and economy of operation and by the minimum of strains and stresses imposed on the parts thereof.

A further object of the invention is an automatic clutch of the above indicated character, which is characterized by a minimum of wear on its parts and by the facility and economy with which it may be maintained.

A further object of the invention is an automatic clutch of the above indicated character wherein certain elements of the fluid clutch transmission serve the purpose of a fly-wheel of the motor as well as that of torque transmission, and an important feature of the transmission as applied to automotive vehicular use is that free wheeling is obtained at the desired low speeds with simplicity and marked effectiveness.

Further objects of the invention will hereinafter appear.

For a better understanding of the invention, reference may be had to the accompanying drawing illustrating one embodiment of the invention.

Referring to the drawing, I have illustrated the invention as embodied in a fluid transmission clutch 1 for transmitting power between a drive shaft 2 and a driven shaft 3. The transmission 1 is particularly suitable for transmissions for automotive vehicles although certain features thereof are useful in other applications. As applied to automotive vehicular use the shaft 2 may be the driven member, driven for example by an internal combustion engine, omitted for convenience in illustration, while the shaft 3 may drive the wheels of the car which are also omitted for convenience.

The transmission embodies a closed casing divided into two parts, a cylindrical part 4 formed integrally with an end closing disk 5 with the latter fastened as by bolts 6 to a hub 7 keyed to the shaft 2. The other part of the divided casing has a cylindrical part 8, an end disk part 9 having a sleeve 10 journaled upon the shaft 3 through the bearing element 10', and a flange part 11 which is fastened to an abutting flange 12 formed on the casing part 4 by means of the bolts 13. Fluid such as oil is contained in the casing and if the bearing element 10' is insufficient to seal against leakage through the sleeve 10 any suitable or additional oil sealing means 14 may be provided for this purpose. In the particular embodiment illustrated, the shaft 3 is provided with a reduced end 3' which is journaled in a suitable bearing element 15 carried by the casing element 4, 5.

The clutch embodies three sets of fluid pressure blade elements, propeller elements 16 and 17 which are driven in unison with the drive shaft 2 and propeller element 18 (duplex) which is driven by or with shaft 3 and is also mounted for free axial movement thereon. When the shaft 2 is the drive shaft the elements 16, 17 are the impeller and the element 18 the runner. One set 16 surrounds the bearing element 15 and is carried by and in fixed relation to the casing element 4, 5. The element 17 is also carried by the casing element 4 for rotation therewith but is adjustably mounted for movement toward and away from the element 16. The element 17 is carried by a disk 19 which is journaled on the shaft 3 by means of the bearing element 20. The element 17 and the disk 19 form a unit and are splined to the interior of the casing 4 for sliding movement axially of the shaft 3, the casing 4 being provided with spline tracks 21, along which tracks are guided lugs 22 formed on the peripheral edge of the disk 19. The element 17 is adjusted axially of the shaft 3 with respect to an axially movable element 18 and the element 18 in response to the speed of the prime mover as, for example, an internal combustion engine or other motor driving the shaft 2. The arrangement is such that at low or predetermined speeds the element 17 is spaced far enough from the unit 18 and the relatively fixed element 16 to avoid transmission of torque or power. This control is in response to the speed of the engine which is effected in the particular embodiment shown by a pair of speed responsive centrifugal weights 23 operating in opposition to a pair of springs 24. The centrifugal weights 23 are pivoted at 25 on brackets 26 fastened or formed on the interior of the casing part 9. Bell crank levers 27 are fastened to and mounted to operate in unison with the centrifugal weights 23 and these levers are connected by means of links 28 with lugs 29 carried by the disk 19. The springs 24 are attached at one end to lugs 30 fastened to the interior of the casing part 9 and at their other end to lugs 31 fastened to the disk 19. These springs 24 tend to hold or retain the blades 17 in the full line position indicated in the drawing, but when the engine or motor speeds up, the centrifugal weights 23 respond to the increased speed by outward movement about the pivots 25, which outward movement through the bell crank levers 27 and links 28 moves the element 17 to the left in opposition to the springs 24. The element 18 is in duplicate with its parts disposed on the opposite sides of a central disk 32 having a hub 33 splined to the shaft 3 for rotation with the shaft but the splining is loosely effected so as to permit the blade unit 18 readily to take up different positions longitudinally of the shaft 3 between the two sets of elements 16 and 17. This splining of the hub 33 on the shaft 3 is indicated at 34 and 35 and through this splining the unit 18 floats back and forth toward and away from the elements 16 and 17. For facilitating the free and unimpeded movement of the floating unit 18 and the movable element 17 the disk 32 is provided with fluid communicating passages 36 and the disk 19 is provided with fluid transmitting passages 37. If desired, the unit 19 may be provided with clearances at its periphery as shown through which the fluid may pass from one side to the other thereof. Some clearance is also provided at the periphery of the disk 19 through which the fluid may escape. Even though the casing should be full of fluid such as oil, the elements 17 and 18 may therefore be freely moved axially of the shafts without undue resistance from the contained liquid.

The elements 16, 17 and 18 are purposely schematically or diagrammatically illustrated, it being understood that any suitable conventional form of blade or blades may be employed for effecting transmission of power between the rotating casing carrying the blades 16 and 17 and the blades 18 when the blades 17 are moved over toward the blades 16 and 18.

The operation of the automatic clutch is as follows:

When the motor, engine or other prime mover is idling, the blade unit 17 is then moved over toward the right by the springs 24 so as to withdraw the blades 17 out of torque transmitting relation with the blades 16 and 18. Upon increase of speed, however, the prime mover and the centrifugal weights 23 respond to this increase in speed by moving outwardly and thereby through the linkages described moving the blades 17 toward the blades 18 and 16 to decrease the distance between these sets of blades. With this increase in speed and movement of the blades 17 toward the left, the rotating casing begins to transmit power or torque to the blades 18. If the torque transmitted to the blades 18 is insufficient to rotate the driven shaft 3, a greater torque may be transmitted by still further increasing the speed of the engine and thereby causing the blades 17 to move closer to the blades 16 and 18. The starting operation continues until the power of the motor has reached its maximum running torque output, at which point the blades may be as close together as they are permitted in practice, as for example, with a clearance between them of about .004 of an inch. At this point there should be practically no slippage in the clutch under normal load. With this arrangement, free idling speed of the motor is effected and the exact and correct amount of power is required or used to move a given load. No power is therefore wasted. Undue strains on the power transmission are thereby obviated, the mechanism is simple and has a minimum of wearing parts, and the rotating casing functions both as a transmission casing and as a fly wheel. These results are effected through the provision of the floating unit 18 between the relatively movable blade units 16 and 17, with the unit 17 operated responsively to the speed of the prime mover, as shown and described.

I claim:

1. In a fluid transmission system, a drive shaft, a driven shaft, said shafts being axially disposed, a fluid casing fastened to and driven by the drive shaft and journaled upon said driven shaft, two fluid impeller elements carried by and mounted within said fluid casing, one of said impeller elements being fixed to the casing, the other of said impeller elements being spaced from the first and splined to rotate with the casing but mounted for movement towards and away from the fixed impeller element, a floating driven element disposed between the first named impeller elements and splined to the driven shaft for free axial movement thereon responsive to fluid pressures and movements inside the casing, and means for moving the movable impeller element towards and away from the floating element.

2. In a fluid transmission system, a drive shaft, a driven shaft, said shafts being axially disposed, a fluid casing fastened to and driven by the drive shaft and journaled upon said driven shaft, two fluid impeller elements carried by and mounted within said fluid casing, one of said impeller elements being spaced from the first and splined to rotate with the casing but mounted for movement towards and away from the fixed impeller element, a floating driven element disposed between the first named impeller elements and splined to the driven shaft for free axial movement thereon responsive to fluid pressures and movement inside the casing, and means for moving the movable impeller element towards and away from the floating element, comprising actuating means responsive to the speed of the driving shaft.

3. In a fluid transmission system, a drive shaft, a driven shaft, said shafts being axially disposed, a fluid casing fastened to and driven by the drive shaft and journaled upon said driven shaft, two fluid impeller elements carried by and mounted within said fluid casing, one of said impeller elements being spaced from the first and splined to rotate with the casing but mounted for movement towards and away from the relatively fixed impeller element, a floating runner element disposed between the impeller elements and splined to the driven shaft for free movement thereon responsive to fluid pressures and movements inside the casing, and means for moving the movable driving impeller element towards and away from the floating element comprising means tending to move the impeller element away from the floating element and means responsive to the speed of the drive shaft for moving the movable impeller element in opposition to the first said means.

4. In a fluid transmission system, a driving member, a driven member, a pair of blade elements rotating in unison with one of said members, said elements being relatively movable toward and away from each other, a floating blade element rotating in unison with the other of said members, said floating element being disposed between and free to take up different positions relatively to the first named elements, and means responsive to the operation of one of said members for causing relative movement between the two first named elements.

5. In a fluid transmission system, a driving member, a driven member, a pair of blade elements rotating in unison with one of said members, said elements being relatively movable toward and away from each other, a floating blade element rotating in unison with the other of said members, said floating element being disposed between the first named elements and being freely movable toward and away from the same, and means responsive to the speed of the driving member for causing relative movement between said two first named elements.

6. In a fluid transmission system, a drive member, a driven member, a fluid casing driven by one of said members, a pair of spaced impeller elements rotating in unison with said fluid casing, one of said impeller elements being movable towards and away from the other of said elements, a floating runner element disposed between said first named two impeller elements and rotating in unison with the other of said shafts, said runner element having propeller blades facing respectively the first named two impeller elements and being freely movable towards and away therefrom, and means for moving the first named movable impeller element with respect to the other first named impeller element.

7. In a fluid transmission system, a drive member, a driven member, a fluid casing driven by one of said members, a pair of spaced impeller elements rotating in unison with said fluid casing, one of said impeller elements being movable towards and away from the other of said elements, a floating runner element disposed between said first named two impeller elements and rotating in unison with the other of said members, said runner element having propeller blades facing respectively the first named two impeller elements and being freely movable towards and away therefrom, and means for moving the movable impeller element with respect to the other impeller element, comprising means acting in response to the rotation of the drive member.

8. In a fluid transmission system, a drive member, a driven member, a fluid casing rotating in unison with one of said members, a pair of spaced impeller elements disposed in said casing and rotating in unison with one of said members, said impeller elements being relatively movable towards and away from each other, a floating runner element disposed between said two impeller elements and rotating in unison with the other of said members, said runner element having propeller blades facing respectively the two impeller elements and being freely movable towards and away therefrom, and means for relatively moving said impeller elements and controlling the relative positions thereof.

BAXTER M. W. FILLMORE.